US007478205B1

(12) United States Patent
Hwang et al.

(10) Patent No.: US 7,478,205 B1
(45) Date of Patent: Jan. 13, 2009

(54) TECHNIQUES FOR PERFORMING DATA OPERATIONS SPANNING MORE THAN TWO DATA PARTITIONS

(75) Inventors: Pei-Ching Hwang, Shrewsbury, MA (US); Michael J. Scharland, Franklin, MA (US); Arieh Don, Newton, MA (US); Kenneth A. Halligan, Leominster, MA (US)

(73) Assignee: EMC Corporation, Hopkinton, MA (US)

( * ) Notice: Subject to any disclaimer, the term of this patent is extended or adjusted under 35 U.S.C. 154(b) by 224 days.

(21) Appl. No.: 11/485,813

(22) Filed: Jul. 12, 2006

(51) Int. Cl.
*G06F 13/00* (2006.01)

(52) U.S. Cl. ........................ 711/152; 711/153; 711/163

(58) Field of Classification Search ................. 711/152, 711/153, 163
See application file for complete search history.

(56) References Cited

U.S. PATENT DOCUMENTS

| | | | | |
|---|---|---|---|---|
| 5,206,939 | A | 4/1993 | Yanai et al. | |
| 5,226,159 | A * | 7/1993 | Henson et al. | 707/8 |
| 5,586,331 | A * | 12/1996 | Levenstein | 710/200 |
| 5,778,394 | A | 7/1998 | Galtzur et al. | |
| 5,845,147 | A | 12/1998 | Vishlitzky et al. | |
| 5,857,208 | A | 1/1999 | Ofek | |
| 5,956,712 | A * | 9/1999 | Bennett et al. | 707/8 |
| 6,732,292 | B2 * | 5/2004 | Hertz et al. | 714/8 |

* cited by examiner

*Primary Examiner*—Reba I Elmore
(74) *Attorney, Agent, or Firm*—Muirhead and Saturnelli, LLC

(57) ABSTRACT

Two data operations, such as write operations, may be processed at a same time in which the two write operations operate on a same address range span. A first of the write operations may write to the first track and the last track in the span but not tracks therebetween. When processing the first write operation, a lock for the first track is obtained and the data is written to the first track data. A lock for the last track is obtained and it is determined whether all tracks between the first and last tracks are unlocked. If so, data is written to the last track. If not, steps of releasing and then reacquiring the lock for the last track and determining whether intervening tracks are locked are repeated until the intervening tracks are not locked. The last track is then written.

20 Claims, 10 Drawing Sheets

250

252

P1:
1. Lock T1, Write T1
2. Lock T2, Write T2
3. Unlock T1
4. Lock T5
5. Inquire T3, T4?
6. if all Unlocked
   then Write T5, unlock T2,T5
   else Unlock T5, go to 4.

254

P2:
1. Lock T2, Write T2
2. Lock T3, Write T3
3. Unlock T2
4. Lock T5
5. Inquire T4?
6. if all Unlocked
   then Write T4, unlock T3,T5
   else Unlock T5, go to 4.

20a

250

```
P1:  1.   Lock T1, Write T1          252
     2.   Lock T2, Write T2
     3.   Unlock T1
     4.   Lock T5
     5.   Inquire T3, T4?
     6.   if all Unlocked
              then Write T5, unlock T2,T5
              else Unlock T5, go to 4.
```

```
P2:  1.   Lock T2, Write T2          254
     2.   Lock T3, Write T3
     3.   Unlock T2
     4.   Lock T5
     5.   Inquire T4?
     6.   if all Unlocked
              then Write T4, unlock T3,T5
              else Unlock T5, go to 4.
```

| Data operation type code 351 |
| --- |
| LBA start address 352 |
| Count 354 |
| Skip mask 356 |
| .. .. .. |

FIG. 8

TECHNIQUES FOR PERFORMING DATA OPERATIONS SPANNING MORE THAN TWO DATA PARTITIONS

BACKGROUND

1. Technical Field

This application generally relates to data operations, and more particularly to techniques used in connection with processing a data operation.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A write command may specify one or more blocks on a data storage device as a target location. In connection with a write command modifying multiple blocks, the write command may be executed so that a first block N affected by the write command is updated prior to the contents at block N+1 also modified by the write command.

In existing systems, two write commands may be issued by one or more hosts to a same target location of a data storage device. The data storage system may receive the foregoing two write commands and perform processing for both write commands at a same time. After both write commands are applied, the target location may contain one of two possible valid data results depending on which write command is applied first. Each of the valid data results is formed by applying one write command completely to the target location prior to applying the second write command in order to preserve the data integrity with respect to a single write command. In order to ensure that the target location contains one of the foregoing valid data results and rather than an invalid data result, processing may be performed.

When the target location of write command spans multiple blocks within a single track, that track may be locked when writing to the track. When the write command spans more than a single track, additional processing may be performed to ensure a valid data result in the target location.

One technique for preserving the integrity of the write command spanning more than a single track includes locking the entire device containing the target location. The foregoing ensures a valid data result but does not allow more than one write command to the device at a time which can be impractical and very undesirable. As an alternative, an embodiment may utilize a technique in which the lock on track N−1 is obtained prior to writing to track N−1. A track is written only after the lock is obtained. In order to write to the next track N, the lock on track N is also obtained while also holding the lock to track N−1. When writing to track N+1, the lock on the previous track N is retained and the lock on track N−1 surrendered. As such, when writing to track N+1, the lock of the previous track N is retained as well as retaining the lock on track N+1 so that at most two tracks are locked at a time when processing a write command. The foregoing preserves data validity for write commands spanning more than one track in which the write command does not skip tracks or blocks at the target location. In other words, when a target location of a write command has an associated range, all blocks within the range are written to in order of increasing address.

Existing systems, such as those operating in accordance with the SCSI standard, may also utilize a skip mask write command which uses a bit mask indicating which blocks or portions of the foregoing range of blocks are to be modified by the write command. The target of the write command may span an address range in which not all blocks or tracks included therein are modified.

SUMMARY OF THE INVENTION

In accordance with one aspect of the invention is a method for performing data operations. At least two data operations having processing performed at a same time and each using data from a same portion are provided. It is determined whether a first address range of the same portion spans more than two data partitions. A lock is associated with each of the data partitions. A first data partition is associated with a starting address of the first address range and a second data partition is associated with an ending address of the first address range. It is determined whether at least one of the two data operations is not applied to each data partition intervening between the first data partition and the second data partition. For each of the two data operations that is not applied to each data partition intervening between the first data partition and the second data partition, a first lock of the first data partition is obtained and a second lock of the second data partition is obtained. It is also determined whether partitions between the first data partition and the second data partition are locked. Each data operation is applied to the second partition in accordance with locations specified in the each data operation when partitions between the first data partition and the second data partition are unlocked. The method may be performed in a multipath environment in which two or more data paths to a data storage device are used simultaneously for two or more data operations. One host may issue the at least two data operations to a same portion of a same device of a same data storage system, and the data storage system may execute the at least two data operations at a same time. Each of two or more hosts may issue a data operation to a same portion of same device of a same data storage system. The data storage system may execute each data operation from each of the two or more hosts at a same time. The at least two data operations may be write operations, and at least one of the write operations may include a bit mask indicating which elements of each data partition to apply the write operation. The at least two data operations may be read operations and at least one of the read operations may include a bit mask indicating which elements of each data partition to apply the read operation. The at least two data operations may include at least one read operation and at least one write operation. The data partitions may be tracks of a data storage device. At least one of the at least two data operations may have a target location with an address range that overlaps at least a portion of another address range of another target location of another one of the data operations. At least one of the at least two data operations may have a same target location having a same address range as another one of the data operations. A lock may be associated with a data partition of a data storage device, and the common portion may be a portion of a data storage device. Each data partition may correspond to a track of data and each partition may include a plurality of logical blocks. Each of the at least two data operations may include a starting logical block of a target location for each data operation, and a bit mask specifying which logical blocks to apply each data operation. A lock may be associated with a data partition of a cache memory. The common portion may be a portion of the cache memory. Each of the at least two data operations may be performed in parallel using different processors of a data storage system. Each of the at least two data operations may be performed using a single processor of a data storage system.

In accordance with another aspect of the invention is another method for performing data operations. At least two data operations having processing performed at a same time and each using data from a same portion are provided. It is determined whether a first address range of the same portion spans more than two data partitions. A lock is associated with each of the data partitions. A first data partition is associated with a starting address of the first address range and a second data partition is associated with an ending address of the first address range. It is determined whether at least one of the two data operations is not applied to each data partition intervening between the first data partition and the second data partition. For each of the at least two data operations that is not applied to each data partition intervening between the first data partition and the second data partition, a first lock of the first data partition is obtained and a second lock of the second data partition is obtained. Locks for partitions between the first data partition and the second data partition are obtained. Each data operation is applied to the second partition in accordance with locations specified in each data operation when a lock to each partition between the first data partition and the second data partition is obtained.

In accordance with another aspect of the invention is a computer-readable medium comprising code for performing data operations. At least two data operations having processing performed at a same time and each using data from a same portion are provided. It is determined whether a first address range of the same portion spans more than two data partitions. A lock is associated with each of the data partitions. A first data partition is associated with a starting address of the first address range and a second data partition is associated with an ending address of the first address range. It is determined whether at least one of the two data operations is not applied to each data partition intervening between the first data partition and the second data partition. For each of the at least two data operations that is not applied to each data partition intervening between the first data partition and the second data partition, a first lock of the first data partition is obtained and a second lock of the second data partition is obtained. It is also determined whether partitions between the first data partition and the second data partition are locked. Each data operation is applied to the second partition in accordance with locations specified in each data operation when partitions between the first data partition and the second data partition are unlocked. The computer readable medium may also include code for processing the at least two data operations in a multipath environment in which two or more data paths to a data storage device are used simultaneously for two or more data operations. A lock may be associated with a data partition of a data storage device, and the common portion may be a portion of a data storage device.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5 and 6 are examples illustrating the use of the techniques described herein for performing a data operation in accordance with an embodiment of the invention;

FIG. 8 is an example representation of a request that may be used in an embodiment of the invention to perform a data operation that may be received and processed by a data storage system.

DETAILED DESCRIPTION OF EMBODIMENT(S)

Figure 1:
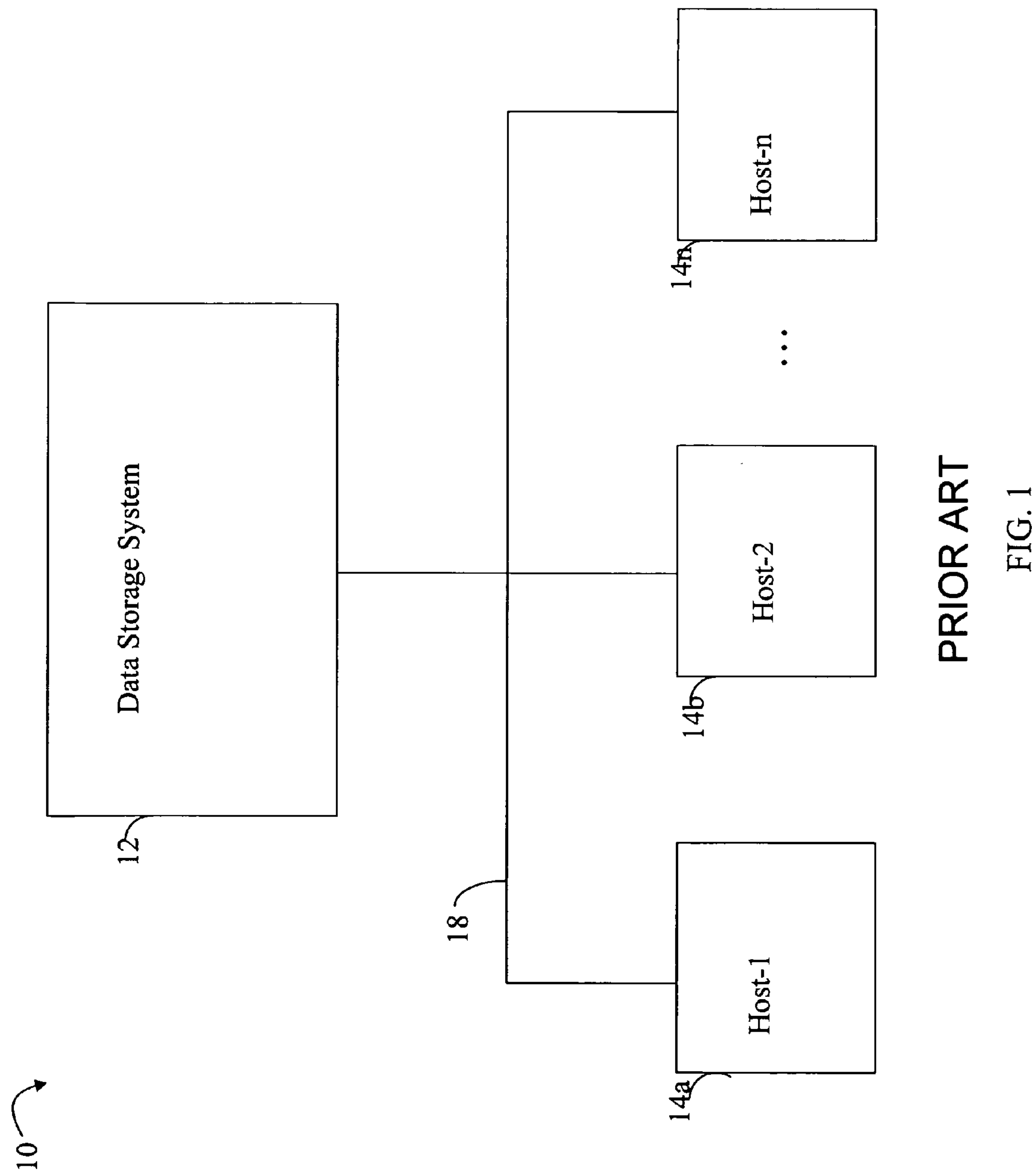
FIG. 1 is an example of a system that may utilize the techniques described herein in accordance with an embodiment of the invention.

Referring now to FIG. 1, shown is an example of an embodiment of a computer system that may be used in performing the techniques described herein. The computer system 10 includes a data storage system 12 connected to host systems 14_a_-14_n_ through communication medium 18. In this embodiment of the computer system 10 and the N hosts 14_a_-14_n_ may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium

18 may be the Internet, an intranet, network or other wireless or other hardwired connection(s) by which the host systems 14*a*-14*n* may access and communicate with the data storage system 12, and may also communicate with others included in the computer system 10.

Each of the host systems 14*a*-14*n* and the data storage system 12 included in the computer system 10 may be connected to the communication medium 18 by any one of a variety of connections as may be provided and supported in accordance with the type of communication medium 18. The processors included in the host computer systems 14*a*-14*n* may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14*a*-14*n* and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14*a*-14*n* may issue a data request to the data storage system 12 to perform a data operation. For example, an application executing on one of the host computers 14*a*-14*n* may perform a read or write operation resulting in one or more data requests to the data storage system 12.

Figure 2A:
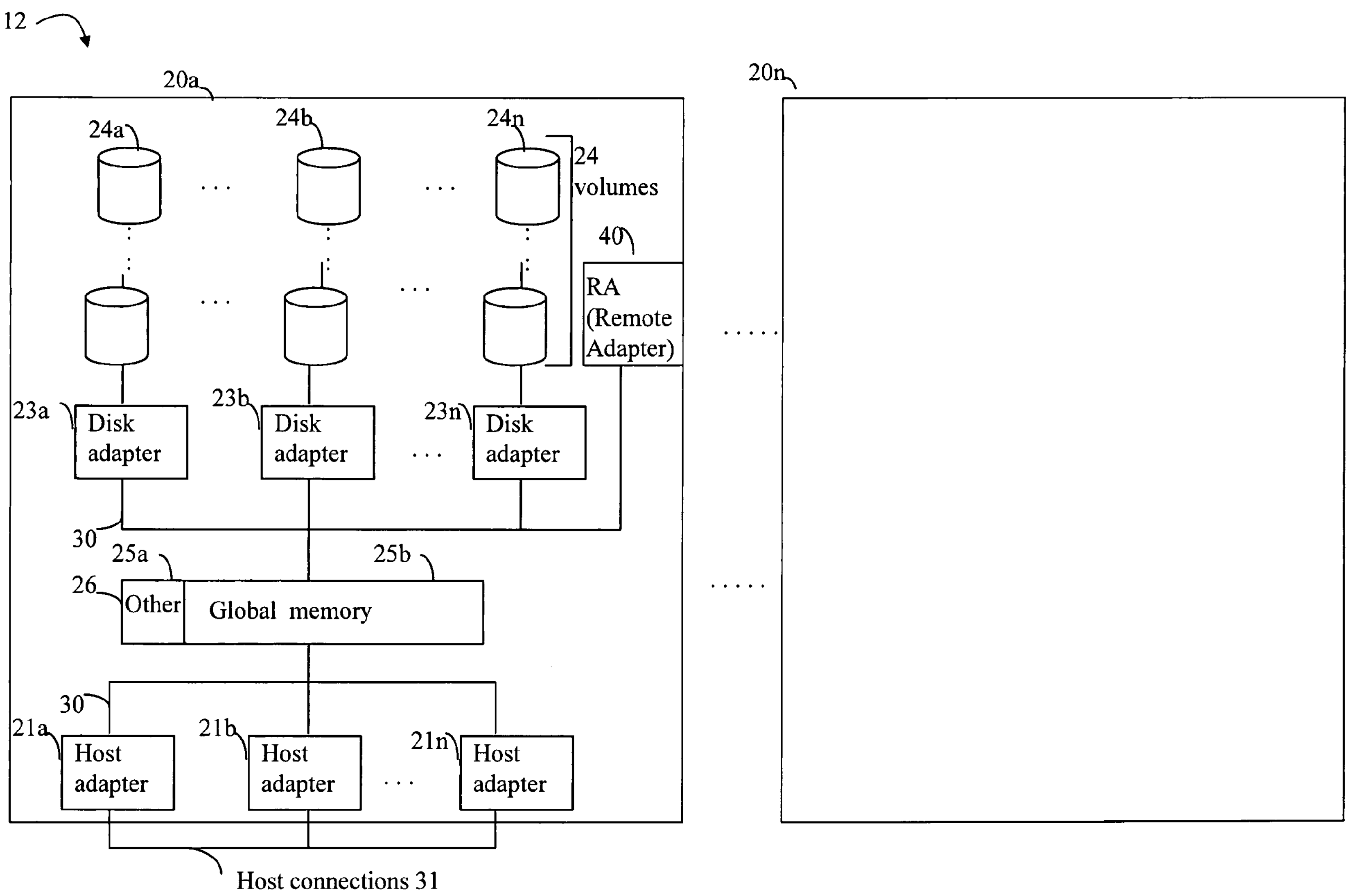
FIG. 2A is an example of a data storage system in accordance with an embodiment of the invention.

Referring now to FIG. 2A, shown is an example of an embodiment of the data storage system 12 that may be included in the computer system 10 of FIG. 1. Included in the data storage system 12 of FIG. 2A are one or more data storage systems 20*a*-20*n* as may be manufactured by one or more different vendors. Each of the data storage systems 20*a*-20*n* may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20*a*. It should be noted that a similar more detailed description may also apply to any one or more of the other elements, such as 20*n*, but have been omitted for simplicity of explanation. It should also be noted that an embodiment may include data storage systems from one or more vendors. Each of 20*a*-20*n* may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20*a*, may include a plurality of disk devices or volumes, such as the arrangement 24 consisting of n rows of disks or volumes 24*a*-24*n*. In this arrangement, each row of disks or volumes may be connected to a disk adapter ("DA") or director responsible for the backend management of operations to and from a portion of the disks or volumes 24. In the system 20*a*, a single DA, such as 23*a*, may be responsible for the management of a row of disks or volumes, such as row 24*a*.

The system 20*a* may also include one or more host adapters ("HAs") or directors 21*a*-21*n*. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25*b* may be used to facilitate data transfers and other communications between the DA's, HA's and RA's in a data storage system. In one embodiment, the DAs 23*a*-23*n* may perform data operations using a cache that may be included in the global memory 25*b*, for example, in communications with other disk adapters or directors, and other components of the system 20*a*. The other portion 25*a* is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20*a* is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
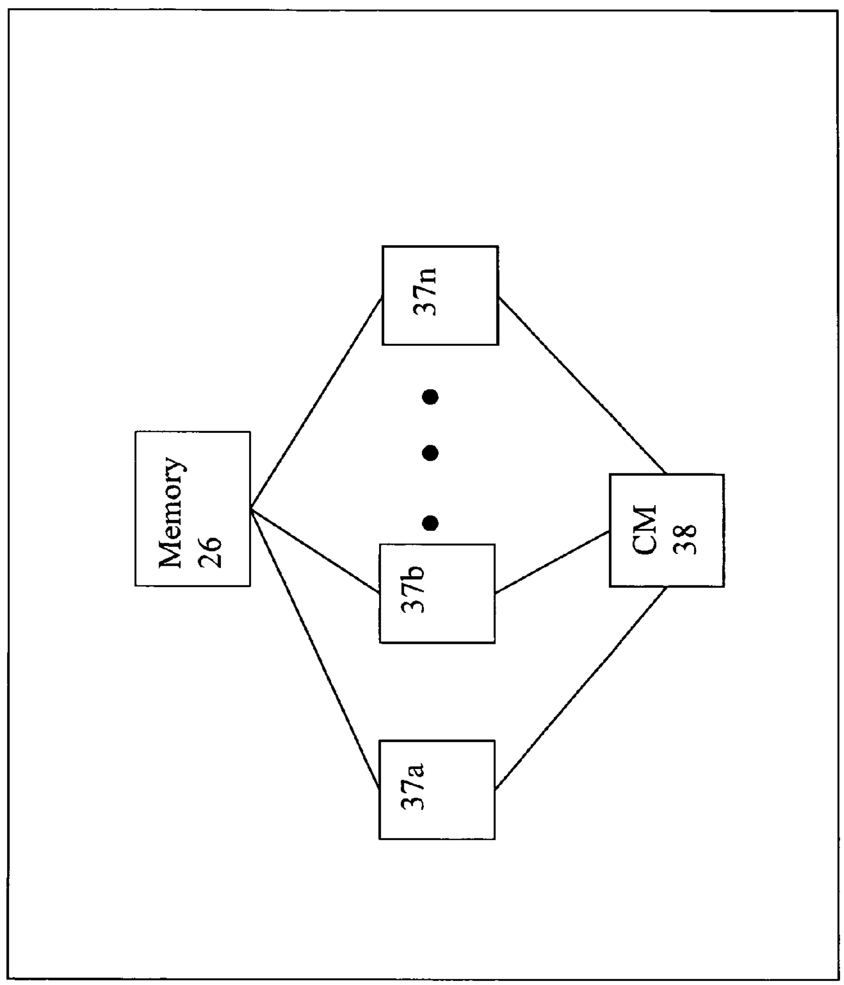
FIG. 2B is a representation of the logical internal communications between the directors and memory included in one embodiment of the data storage system of FIG. 2A.

Referring now to FIG. 2B, shown is a representation of the logical internal communications between the directors and memory included in a data storage system. Included in FIG. 2B is a plurality of directors 37*a*-37*n* coupled to the memory 26. Each of the directors 37*a*-37*n* represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

Figure 3:
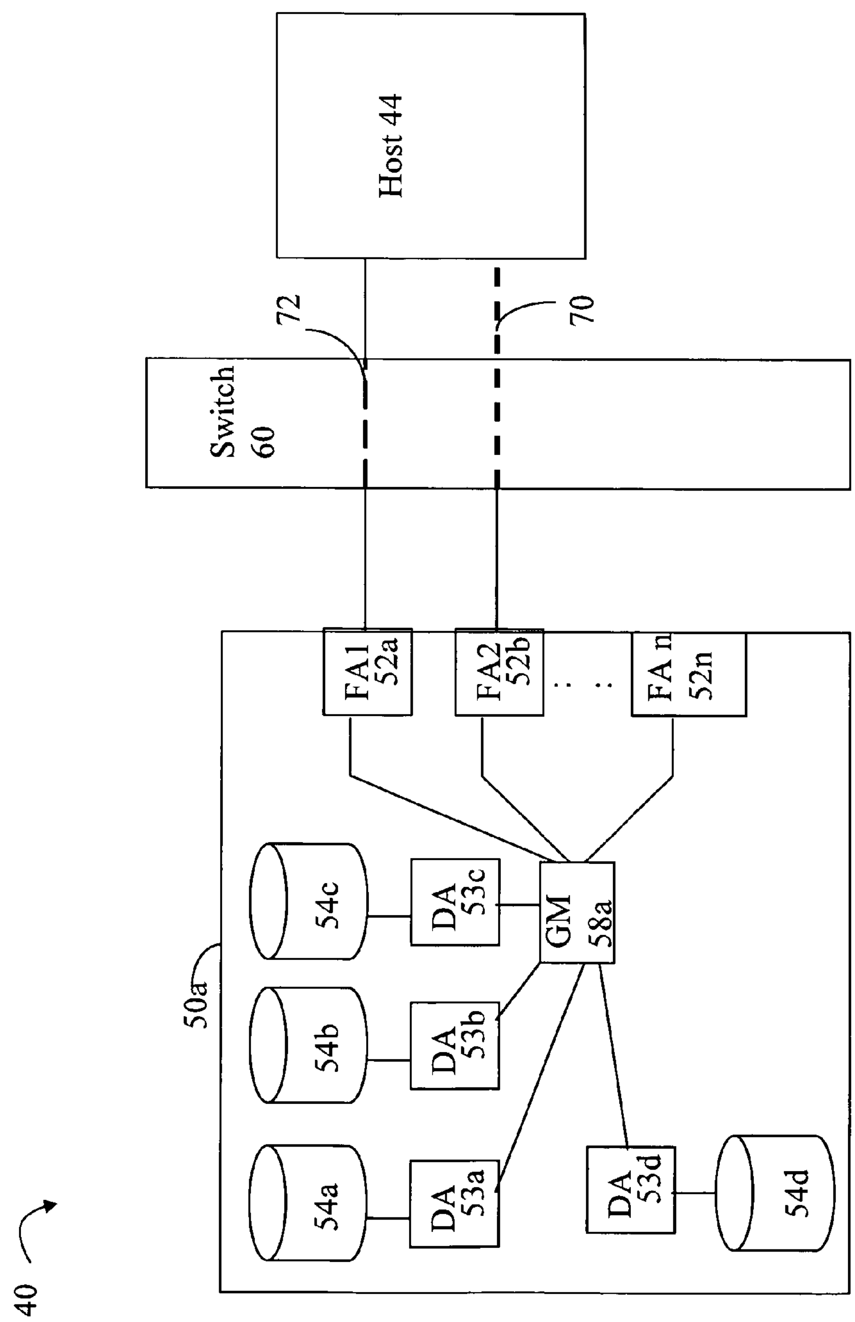
FIG. 3 is a more detailed example of a system that may utilize the techniques described herein in accordance with an embodiment of the invention.

Referring now to FIG. 3, shown is an example of an embodiment of a computer system 40 that may be used in connection with the techniques described herein. It should be noted that the embodiment illustrated in FIG. 3 presents a simplified view of some of the components of a computer system as generally illustrated in FIGS. 1 and 2A, for example, including only some detail of the data storage system 50*a* for the sake of illustration.

Included in the system 40 is data storage system 50*a*, a switch 60 and host 44. The data storage system 50*a* and the host 44 may communicate using switch 60. In this example, the data storage system 50*a* includes data storage devices 54*a*-54*d*, DAs 53*a*-53*d*, global memory (GM) 58*a*, and multiple Fibre Channel Adapters (FAs) 52*a*-52*n*. Each of the FAs 52*a*-52*n* has a Fibre Channel connection to the switch 60 to facilitate communications with the host 44. For example, the host 44 may issue a command in the form of one or more messages to data storage system 50*a* through switch 60 over path 70 or 72 to one of the FAs 52*a*-52*n*. Similarly, the switch 60 may be used to communicate messages from the data storage system 50*a* to the host. In one embodiment, the switch 60 may be an 8 port switch although a switch used in connection with the techniques herein may include any number of ports.

In the example 40, the host may communicate with the data storage system 50*a* over one or more paths such as 70 and 72. Embodiments in which data operations can be communicated from one or more hosts to the data storage system over more than one path may be characterized as a multipath environment with respect to host-data storage system communications. In other words, multipathing allows for two or more data paths to the data storage system to be simultaneously used for read and/or write operations. In such embodiments, the host may issue two commands or data operations, such as read or write operations, involving the same device locations. The two commands may be processed by the data storage system at the same time. For example, the host 44 may issue a first write command to write to a first location and may also issue a second write command to write to the first location. The first write command may be sent over path 72 and the second write command may be sent over path 70 so that the data storage system 50*a* may perform processing for both write commands at the same time.

A write command may specify one or more blocks on a data storage device as a target location. In connection with a write command modifying multiple blocks, the write command may be executed so that a first block N affected by the write command is updated prior to the contents at block N+1 also modified by the write command. A track may contain a number of blocks, such as 64 blocks. Each block may have a size, such as, for example 512 bytes. It should be noted that other track and block sizes may be used in an embodiment in connection with the techniques described herein.

Figure 4:
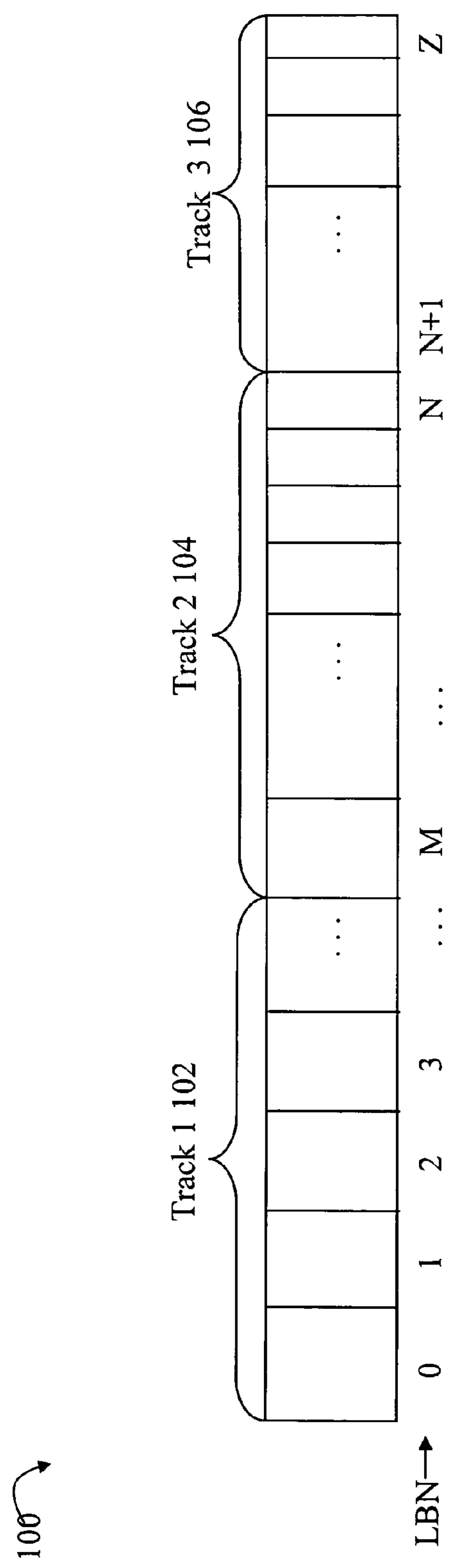
FIG. 4 is an example illustrating a logical representation of a storage device that may be used in an embodiment of the invention.

Referring now to FIG. 4, shown is an example illustrating a logical representation of a storage device. The example 100 includes a logical representation of the storage layout of a device including multiple logical blocks. In the example 100, each block has a unique logical block number denoted LBN. As described above, a track 102 may contain a number of physically consecutive blocks. When a write command is performed, a starting address or LBN may be specified as well as a length in blocks. The range of addresses formed by the starting LBN to the ending LBN (e.g., starting LBN+length−1) may form the target location of write operation. Processing for the write command may begin by first writing the data to the starting address and proceeding sequentially in increasing address order to each consecutive block in the target location. For example, if the write command writes data to LBN 0, 1 and 2, processing is performed to first write the data to LBN 0, then LBN 1, and finally LBN2. The foregoing may be referred to as the sequentiality of a write command.

In systems such as those utilizing SCSI technologies, two write commands may be issued by one or more hosts to a same target location of a data storage device. It should be noted that the target locations of the two write commands may also have some overlap or portion in common rather than span the exact same range of addresses. The data storage system may receive the foregoing two write commands and perform processing for both write commands at a same time. In a system, such as a data storage system operating in accordance with the SCSI standard, there may be more than one possible valid data result. The number of valid data results varies in accordance with the number of commands executed in parallel. After both write commands are applied, the target location may contain one of the possible valid data results depending on the order in which the commands being performed in parallel are applied. Each of the valid data results is formed by applying one write command completely to the target location prior to applying the any other write command in order to preserve the data integrity with respect to a single write command.

For example, a data storage system may perform processing for two write commands at the same time. The first write command writes the data "A" to LBN 1 and the second write command writes the data "B" to LBN 1. After applying both write commands, LBN 1 may contain either "A" or "B" depending on which write command is applied last and both may be considered valid data results for LBN 1.

Prior to writing to a target location, a process may obtain a lock on the target location. The storage granularity of the locking mechanism may vary with each embodiment. In one embodiment, the smallest unit of storage that may be associated with a lock is per track. As such, prior to writing to LBN 1, a process may obtain a lock for track 102. Locking a single track may be used to preserve the data integrity of a target location having a range of addresses or span not more than a single track. Additional processing may be performed in an embodiment in order to ensure that the target location contains a valid data result when the target location of the two write commands spans more than a single track.

One technique for preserving the integrity of the write command spanning more than a single track includes locking the entire device containing the target location. The foregoing ensures a valid data result but does not allow more than one write command to the device at a time which can be impractical and very undesirable. As an alternative, an embodiment may utilize a technique in which the lock on track N−1 is obtained prior to writing to track N−1. A track is written only after the lock is obtained. In order to write to the next track N, the lock on track N is obtained while also holding the lock to track N−1. When writing to track N+1, the lock on the previous track N is retained and the lock on track N−1 surrendered. As such, at most two tracks are locked at a time when processing a write command.

To illustrate, suppose a data storage system is simultaneously processing or executing two write commands. A first write command writes "A" to all LBNs of tracks 102, 104 and 106, and a second write command writes "B" to the same tracks 102, 104 and 106. A first process processing the first write command begins where a lock is obtained for track 102 and "A" is written to successively to each LBN of track 102. A second process processing the second write command begins and tries to obtain the lock for track 102. The second process waits because track 102 is locked. The first process obtains the lock for the track 104 while retaining the lock for track 102 and writes "A" to each LBN of track 104. The second process cannot write to track 102 until the lock for track 102 is available. The first process now performs steps to write to track 106. The first process releases the lock on track 102 and obtains the lock for track 106. The second process is now able to obtain the lock on track 102 and write to track 102.

In connection with the foregoing, several things should be noted. The second process which started after the first process will not, for the duration of the foregoing write commands, write to a location beyond that which the first process is writing due to the sequentiality of a write command as described above.

The foregoing of obtaining the lock on track "N−1" and "N" when writing to track "N" preserves data validity for simultaneous write commands spanning more than one track in which the write commands do not skip tracks or blocks of the target location. In other words, when a target location of a write command has an associated range, all blocks within the range are written to in order of increasing address. However, in an embodiment operating in accordance with the SCSI standard, a skip mask write command may be processed. The skip mask write command uses a bit mask indicating which blocks of the target location, or portions thereof, are to be modified by the write command. With the skip mask write command, the target of the skip mask write command may span an address range in which not all blocks or tracks included therein are modified. As such, when a skip mask write command spans more than one track, the status of locks for those tracks which are skipped in connection with the skip mask write command may not be examined. As a result of processing two skip mask write commands at the same time which write to a same target location and utilize a skip mask, the target location may contain an invalid data result.

When processing two write commands which write to a same target location in an embodiment which supports the skip mask write command, additional processing using techniques described herein may be performed to ensure that the target location contains a valid result and preserves the data integrity with respect to a write command.

It should be noted that the techniques described herein may be illustrated with respect to a skip mask write command but may also be used in connection with skip mask read commands. For example, the techniques described herein may be used in an embodiment operating in accordance with the SCSI standard which includes a skip mask write command and also a skip mask read command. Additionally, examples in following paragraphs may be illustrated using two skip mask write commands. As will be appreciated by those skilled in the art, the foregoing two commands need not have a target location spanning the exact same address range. The techniques described herein may also be used when the foregoing two commands have target locations which overlap or have some common address range portion. The techniques described herein may also be used when performing more than two such commands or data operations simultaneously.

Figure 5:
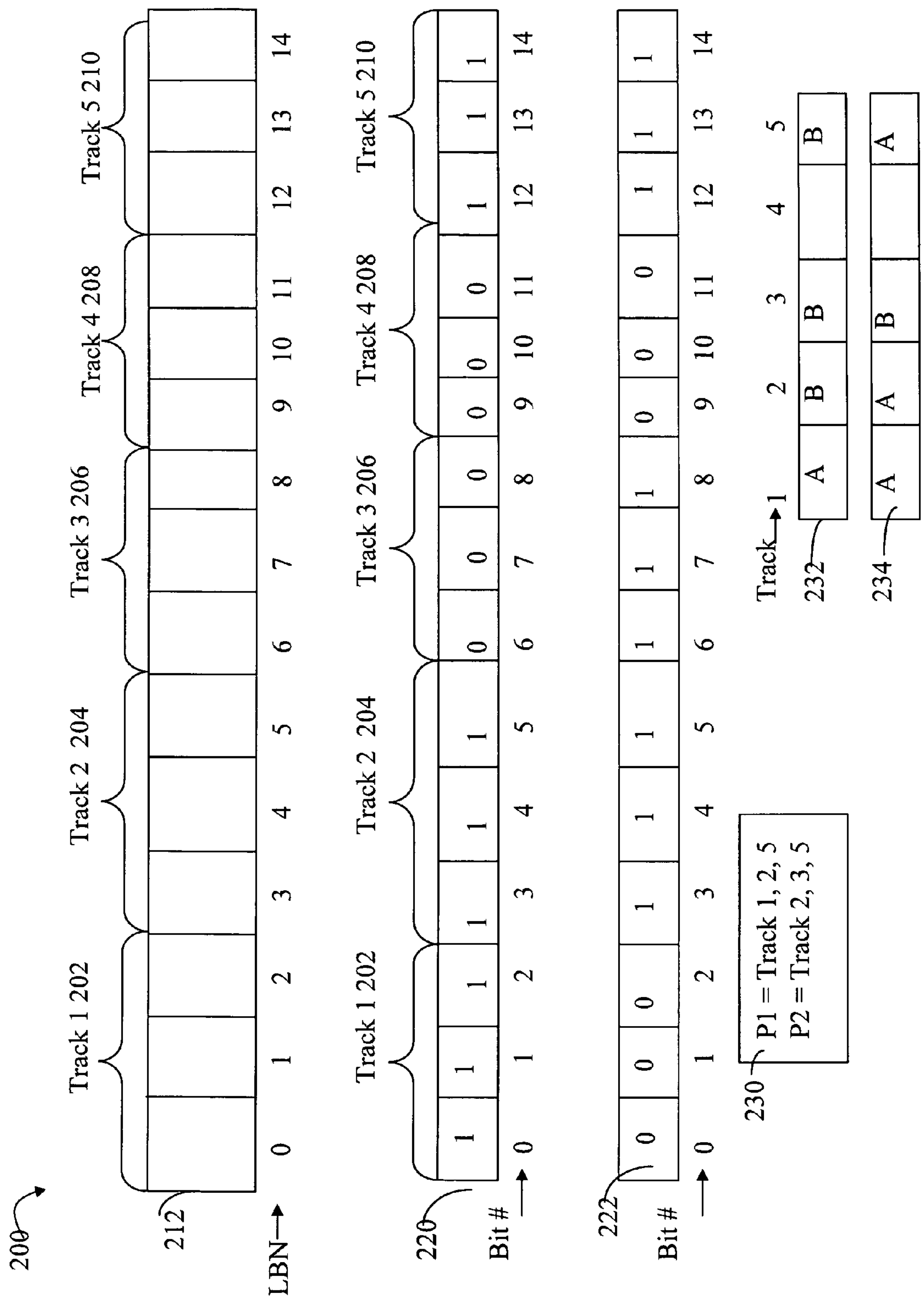

Referring now to FIG. 5, shown is an example illustrating use of techniques described herein for ensuring data integrity when two or more data operations may be executed at the same time. The example 200 includes a representation 212 of a target storage device in the data storage system. The element 212 may represent LBNs of an LV having 5 tracks 202, 204, 206, 208 and 210. Element 220 represents the skip mask of a first skip mask write command and element 222 represents the skip mask of a second skip mask write command. Each of the skip masks includes a bit mask value corresponding to an LBN of 212. A value of 1 in a skip mask entry indicates that the write command writes data to the corresponding LBN. A value of 0 in a skip mask entry indicates that the write command skips or does not write data to the corresponding LBN. Element 230 summarizes the tracks affected by the foregoing first and second write commands. In 230, P1 represents the processing of the first write command having skip mask 220, and P2 represents the processing of the second write command having skip mask 222. In this example, process P1 writes "A" to each LBN in the target location in accordance with the skip mask 220 and process P2 writes "B" to each LBN in the target location in accordance with skip mask 222. Element 232 represents a first valid result in the target location by track contents when the first write command is executed followed by execution of the second write command. Element 234 represents a second valid result in the target location by track contents when the second write command is executed followed by the first write command.

In connection with the techniques herein, a data storage system operating in a multipath environment, for example, as illustrated in FIG. 3, may execute the foregoing first and second write commands at the same time. When a write command spans a single track, a process obtains the lock for the track, writes to the track and releases the lock for the track when the writing is complete. When a write command spans more than a single track but not more than two consecutive tracks, the lock on the first track is obtained and the first track is written to. The lock on the second track is obtained while retaining the lock on the first track. The second track is then written to and the locks of the first and second tracks are released after the writing operation to the second track is complete.

When a write command spans more than two tracks, processing may be performed in accordance with a first track currently locked for writing and a second track corresponding to the next track to be written to. The lock on the second track is obtained. If the second track is the next consecutive track with respect to the first track, write to the second track, and release the lock on the first track. If the second track is not the next consecutive track, examine the status of the locks of the intervening or skipped tracks. For example, if the first track is track 1 and the second track is track 5, examine the status of the locks of tracks 2, 3, and 4. If all the locks of the skipped tracks are unlocked, write to track 5. If any one or more of the locks of the intervening or skipped tracks are locked, release the lock on track 5, and then perform processing steps to acquire the lock on track 5 again and re-examine the status of the locks of the skipped tracks. The foregoing process of releasing the lock on track 5, reacquiring the lock on track 5, and examining the status of the intervening locks is performed until the all the skipped tracks are unlocked. Then the write is performed to track 5.

Processing of the foregoing technique will be illustrated with respect to the example 200 of FIG. 5.

Referring now to FIG. 6, shown is an example 250 of processing steps that may be performed by process P1 and P2 in connection with the two write commands illustrated in FIG. 5. Element 252 includes a representation of the processing steps performed by P1 when processing the first write command with skip mask 220. Element 254 includes a representation of the processing steps performed by P2 when processing the second write command with the skip mask 222. For purposes of illustration, the description in each of 252 and 254 is made with respect to performing operations on each track although the skip mask specifies performing writes to each LBN in a track. For example, an operation with respect to track "n" is denoted "Tn". The notation in 252 step 1 of "Write T1" means that LBNs in the first track (e.g. "T1") are written to in accordance with the skip mask 220. The steps in each of 252 and 254 are performed in the order indicated. If a step indicates a Lock operation, processing waits at the step until the lock is acquired.

Element 252 includes steps for P1 executing a skip mask write command to store data in tracks 1, 2, and 5. Element 252 includes a step 1 in which an attempt is made to acquire the lock on the track 1 (e.g., denoted "T1"). Once the lock for T1 is acquired, a write to T1 is performed and execution of step 2 is performed. At step 2, an attempt is made to acquire the lock on T2. Once the lock for T2 is acquired, a write to T2 is performed because there are no intervening tracks between T1 and T2. Prior to writing to T2, the process P1 has both locks on T1 and T2. At step 3 after the write to T2 is complete, the lock on T1 is released and control proceeds to step 4 where an attempt is made to acquire the lock on T5. At step 5, an inquiry is made as to the status of the locks of the intervening or skipped tracks T3 and T4. At step 6, if all the locks of the intervening tracks are unlocked, then processing is performed to write to T5. After the writing to T5 is complete, the locks for tracks T2 and T5 are released. Otherwise, the lock for track T5 is released and processing continues with step 4. It should be noted that prior to writing to T5, the lock on T5 and the previously written track T2 are held by P1 while P1 examines the status of the locks of the intervening tracks T3 and T4. Based on the status of the locks of the intervening tracks, P1 determines the next processing performed. P1 only writes to the track T5 when all the intervening tracks are unlocked.

Element 254 similarly sets forth processing steps performed by P2 executing a write command to store data in tracks 2, 3 and 5. Element 252 includes a step 1 in which an attempt is made to acquire the lock on the track 2 (e.g., denoted "T2"). Once the lock for T2 is acquired, a write to T2 is performed and execution of step 2 is performed. At step 2, an attempt is made to acquire the lock on T3. Once the lock for T3 is acquired, a write to T3 is performed because there are no intervening tracks between T2 and T3. Prior to writing to T3, the process P2 has both locks on T2 and T3. At step 3 after the write to T3 is complete, the lock on T2 is released and control proceeds to step 4 where an attempt is made to acquire the lock on T5. At step 5, an inquiry is made as to the status of the locks of the intervening or skipped track T4. At step 6, if the locks of the intervening track is unlocked, then processing is performed to write to T5. After the writing to T5 is complete, the locks for tracks T3 and T5 are released. Otherwise, the lock for track T5 is released and processing continues with step 4. It should be noted that prior to writing to T5, the lock on T5 and the previously written track T3 are held by P2 while P2 examines the status of the locks of the intervening track T4. Based on the status of the locks of the intervening track, P2 determines the next processing performed. P2 only writes to the track T5 when the intervening track is unlocked.

In connection with the foregoing, if processing of P1 and P2 are performed at a same time, valid data results in accordance with 232 or 234 are obtained. Using the foregoing techniques, the data integrity of the executing write commands may be preserved to ensure one of the two valid results of 232 or 234 by examining the status of the locks of any skipped tracks. If a first process performs a write to a track X and then is performing processing to write to a subsequent track Y when there are intervening tracks between X and Y, the first process is not permitted to write to track Y if there is another second process currently writing to one of the intervening or skipped tracks.

Figure 7:
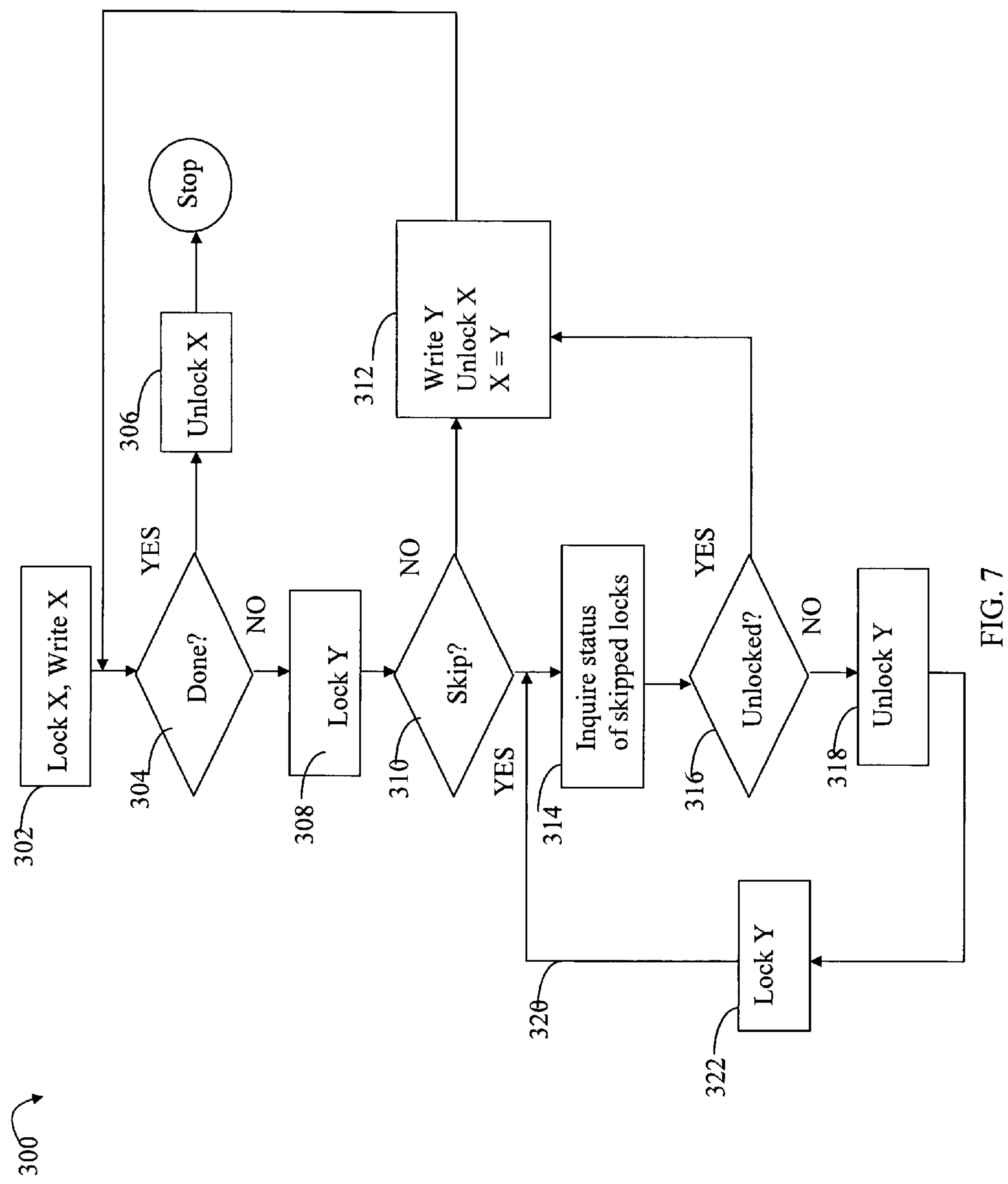
FIG. 7 is a flowchart of processing steps that may be performed in an embodiment of the invention using the techniques described herein to perform a data operation.

Referring now to FIG. 7, shown is a flowchart of processing steps that may be performed in an embodiment in connection with the techniques described herein. The steps of flowchart 300 may be performed in a data storage system in connection with processing received data operations. It should be noted that flowchart 300 generalizes the process illustrated in connection with FIGS. 5 and 6 when performing a skip mask write operation. It should be noted that the processing of 300 is with respect to a skip mask write operation but may also be used in connection with processing skip mask read operations alone, or in combination with, skip mask write operations, as well as other types of read and/or write operations. In those steps of 300 (e.g., 302 and 312) where "Write" is indicated as the skip mask write data operation, the step may be modified to state "data operation" where the data operation is either a skip mask read or a skip mask write operation in accordance with a data request currently being processed. In such an embodiment, the lock on a track may be obtained when processing any read operation or a write operation.

The steps of 300 are performed with respect to a current track X and a next track Y (if any) for a skip mask write data operation or a skip mask read data operation currently being processed. At step 302, an attempt is made to obtain the lock for the current track X. Once the current lock for track X is obtained, write operation processing to track X is performed. It should be noted that in connection with steps of flowchart 300, the operation "Lock" with respect to an indicated track (either X or Y) means that processing is performed to obtain the lock. Processing does not proceed until the lock is obtained so a wait may be implied if another process has the already acquired the indicated lock. At step 304, a determination is made as to whether processing of the write command is complete. If so, control proceeds to step 306 where the lock for track X is released and processing stops. Otherwise, if step 304 evaluates to no, control proceeds to step 308 to obtain the lock on track Y, the next track to be written to in accordance with the write command being processed. Once the lock on track Y is obtained, a determination is made as to whether there are any intervening or skipped tracks between X and Y. If not, control proceeds to step 312 to write to track Y, unlock X, and assign Y to X so that the next track Y of the current iteration becomes the current track X. From step 312, control proceeds to step 304 to process any subsequent tracks.

If step 310 evaluates to yes indicating that the current skip mask write command being processed includes a skip mask in which tracks are skipped, control proceeds to step 314 where the status of the locks of the one or more skipped or intervening tracks is determined. A determination is made at step 316 as to whether all the foregoing locks are unlocked. If so, control proceeds to step 312. Otherwise, control proceeds to step 318 where the lock for the track Y is released and then an attempt is made to reacquire the lock on Y at step 322. From step 322, control proceeds to step 314.

Referring now to FIG. 8, shown is an example of an embodiment of a request that may be received by a data storage system utilizing the techniques herein. The request 350 may be a request to perform a data operation such as a skip mask read operation or a skip mask write operation. The request 350 may include a data operation type code 351 indicating whether the data operation is a read operation, a write operation and the like. The request 350 may also include an LBA starting address 352 identifying the starting location for the data operation of the request. The count 354 may specify a length such as a number of blocks of the data operation. It should be noted that if the data operation is a skip mask read or write operation, the count indicates the number of blocks either read or written in connection with the data operation. In other words, the count 354 indicates the number of "1" LBN locations in the skip mask field 356. The skip mask 356 may be a bit mask with an entry for each LBN in an address range of a target location. If a "1" occurs in an entry of the mask 356, the corresponding LBN is operated upon with respect to the current data operation. Otherwise, the entry contains a "0" and no processing is performed for the corresponding LBN in connection with the data operation of the request 350.

Rather than implement a data operation, such as a read or write operation, which skips data portions as illustrated in FIG. 8 with a single request, an embodiment may use more than one command to implement a data operation which skips data portions as described herein.

Figure 9:
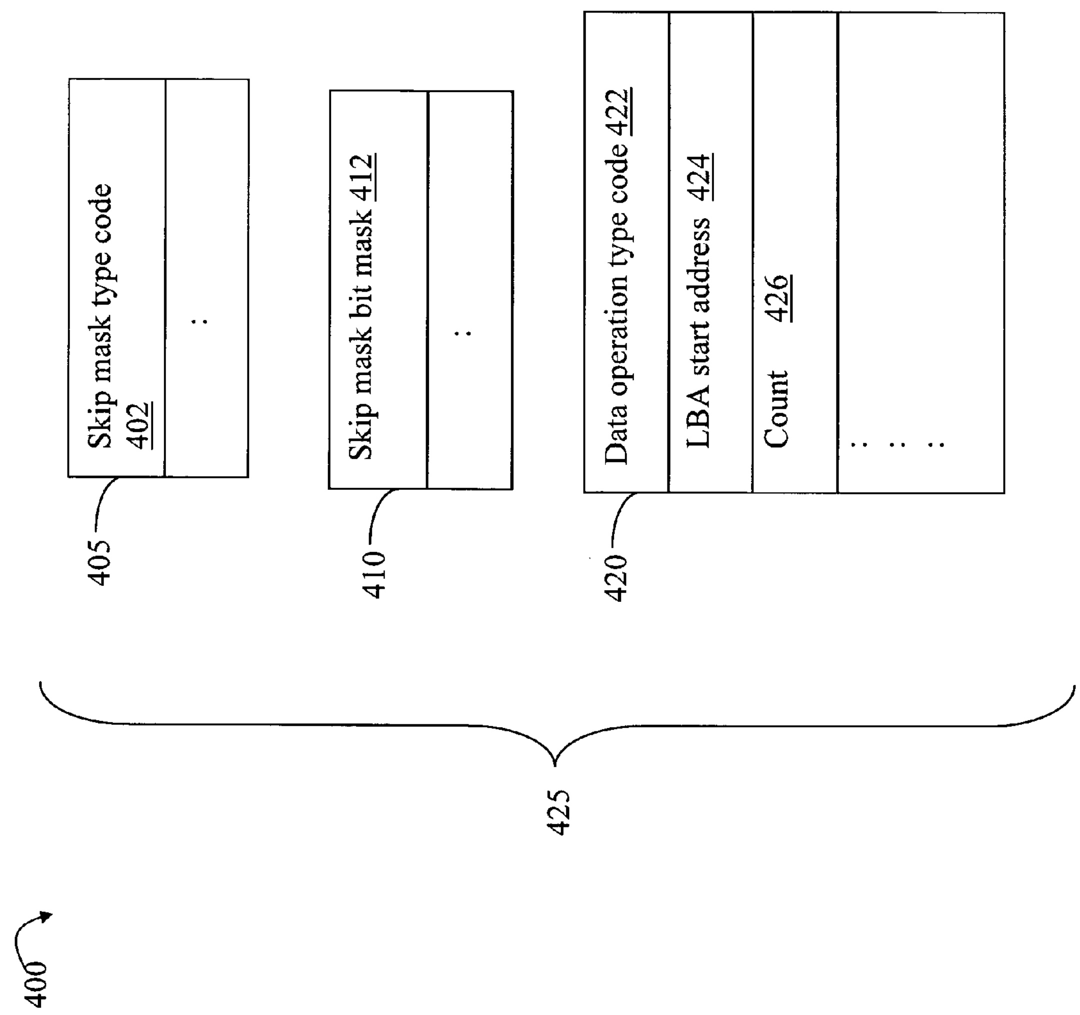
FIG. 9 is an example representation of a series of messages that may be used in an embodiment of the invention in connection with instructing a data storage system to perform a data operation using the techniques herein.

Referring now to FIG. 9, shown is an example of a series of commands that may be issued to a data storage system in connection with the techniques described herein. The series of 3 commands illustrated in 400 may be sent to a data storage system to instruct the data storage system to perform a skip mask read or skip mask write operation which skips one or more blocks as described herein. The commands 425 of the example 400 may be performed and used in an embodiment as an alternative, for example, to the request of FIG. 8.

An embodiment may send a first command 405 to the data storage system which indicates the type of skip mask command (e.g., read or write) is being described. The command 405 may include a field 402 with a type code indicating, for example, whether the skip mask command is a skip mask read or a skip mask write command. An embodiment may send a second message 410 to the data storage system including the skip mask as in the skip mask bit mask 412. Field 412 may include, for example, the bit mask 220 or 222 of FIG. 5. Field 412 is similar to field 356 as described in connection with FIG. 8. An embodiment may send a third message 420 which includes a data operation type code 422 indicating whether a read or write operation is being described by the message 420. The message 420 may be characterized as a same message send when performing a regular read or write operation which does not skip one or more data portions in connection with the data operation. The field 424 may indicate the LBA start address of the data operation and the field 426 indicates the count or number of blocks to be written or read in accordance with the data operation of the code 422. It should be noted that the fields 424 and 426 are respectively similar to fields 352 and 354 of FIG. 8.

The techniques described herein may be useful in an embodiment which is characterized as a multipath environment as well as others in which a data storage system may receive and perform processing for two or more data operations simultaneously. The techniques described herein may be performed with respect to data as may be stored on a storage device such as a disk. The techniques described herein may also be used in connection with data as may be stored in a form of memory such as, for example, a global memory or cache of the data storage system. If the techniques described herein are performed with respect to data stored in cache, for example, a lock may be obtained for each cache slot corresponding to one track of data.

As described herein, processing for two or more commands may be performed at a same time by a data storage system. The processing may be performed by one or more processors of the data storage system. For example, if two skip mask write commands are being processed by a data storage system, each command may be performed in parallel in which a first processor executes code for processing a first skip mask write command and a second different processor executes code for processing a second skip mask write command. An embodiment may also perform processing for the foregoing two commands using a same processor in which a first process may perform processing for the first command and a second process may perform processing for the second command. Using a single processor, techniques known in the art may be used, for example, in which the single processor may schedule the first and second processes for execution by swapping each process in for execution by the processor for time slices until each process completes.

It should be also noted that in connection with the techniques described herein, an embodiment is set forth in which an inquiry regarding the lock status of skipped tracks is made, for example, at step 314. An embodiment may also obtain the locks for the intervening or skipped tracks as an alternative to just inquiring regarding the status of such locks. In such an embodiment in which the locks of the skipped tracks are obtained, different techniques may be utilized to avoid problems such as deadlock. For example, an embodiment may allow an executing process to either obtain all the locks at one time for all intervening or skipped tracks, or release all such locks.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing data operations comprising:

providing at least two data operations having processing performed at a same time and each using data from a same portion;

determining whether a first address range of said same portion spans more than two data partitions, wherein a lock is associated with each of said data partitions, a first data partition is associated with a starting address of said first address range and a second data partition is associated with an ending address of said first address range, and determining whether at least one of said two data operations is applied to said first data partition and said second data partition and is not applied to any data partition intervening between said first data partition and said second data partition; and for each of said at least two data operations that spans more than two data partitions, is applied to said first data partition and said second data partition, and is not applied to any data partition intervening between said first data partition and said second data partition, performing processing, said processing including:

obtaining a first lock of said first data partition;

applying said data operation to said first data partition;

obtaining a second lock of said second data partition;

determining whether partitions between said first data partition and said second data partition are locked; and applying said each data operation to said second partition in accordance with locations specified in said each data operation when partitions between said first data partition and said second data partition are unlocked and while holding said first lock and said second lock.

2. The method of claim 1, wherein said method is performed in a multipath environment in which two or more data paths to a data storage device are used simultaneously for two or more data operations.

3. The method of claim 2, wherein one host issues said at least two data operations to a same portion of a same device of a same data storage system, and said data storage system executes said at least two data operations at a same time.

4. The method of claim 2, wherein each of two or more hosts issue a data operation to a same portion of same device of a same data storage system, and said data storage system executes each data operation from each of said two or more hosts at a same time.

5. The method of claim 1, wherein said at least two data operations are write operations, and at least one of said write operations includes a bit mask indicating which elements of each data partition to apply said write operation.

6. The method of claim 1, wherein said at least two data operations are read operations and at least one of said read operations includes a bit mask indicating which elements of each data partition to apply said read operation.

7. The method of claim 1, wherein said at least two data operations include at least one read operation and at least one write operation.

8. The method of claim 1, wherein said data partitions are tracks of a data storage device.

9. The method of claim 1, wherein at least one of said at least two data operations has a target location with an address range that overlaps at least a portion of another address range of another target location of another one of said data operations.

10. The method of claim 1, wherein at least one of said at least two data operations has a same target location having a same address range as another one of said data operations.

11. The method of claim 1, wherein a lock is associated with a data partition of a data storage device, and said common portion is a portion of a data storage device.

12. The method of claim 11, wherein each data partition corresponds to a track of data and each partition includes a plurality of logical blocks.

13. The method of claim 12, wherein each of said at least two data operations includes a starting logical block of a target location for said each data operation, and a bit mask specifying which logical blocks to apply said each data operation.

14. The method of claim 1, wherein a lock is associated with a data partition of a cache memory, and said common portion is a portion of said cache memory.

15. The method of claim 1, wherein each of said at least two data operations are performed in parallel using different processors of a data storage system.

16. The method of claim 1, wherein each of said at least two data operations are performed using a single processor of a data storage system.

17. A method for performing data operations comprising:

providing at least two data operations having processing performed at a same time and each using data from a same portion;

determining whether a first address range of said same portion spans more than two data partitions, wherein a lock is associated with each of said data partitions, a first data partition is associated with a starting address of said first address range and a second data partition is associated with an ending address of said first address range, and determining whether at least one of said two data operations is applied to said first data partition and said second data partition and is not applied to any data partition intervening between said first data partition and said second data partition; and for each of said at least two data operations that spans more than two data partitions, is applied to said first data partition and said second data partition, and is not applied to any data partition intervening between said first data partition and said second data partition, performing processing, said processing including:

obtaining a first lock of said first data partition;

applying said data operation to said first data partition;

obtaining a second lock of said second data partition;

obtaining locks for partitions between said first data partition and said second data partition; and applying said each data operation to said second partition in accordance with locations specified in said each data operation when a lock to each partition between said first data partition and said second data partition is obtained and while holding said first lock and the second lock.

18. A computer-readable medium comprising executable code stored thereon for performing data operations, the computer-readable medium comprising executable code stored thereon for:

providing at least two data operations having processing performed at a same time and each using data from a same portion;

determining whether a first address range of said same portion spans more than two data partitions, wherein a lock is associated with each of said data partitions, a first data partition is associated with a starting address of said first address range and a second data partition is associated with an ending address of said first address range, and determining whether at least one of said two data operations is applied to said first data partition and said second data partition and is not applied to any data partition intervening between said first data partition and said second data partition; and for each of said at least two data operations that spans more than two data partitions, is applied to said first data partition and said second data partition, and is not applied to any data partition intervening between said first data partition and said second data partition, performing processing, said processing including:

obtaining a first lock of said first data partition;

applying said data operation to said first data partition;

obtaining a second lock of said second data partition;

determining whether partitions between said first data partition and said second data partition are locked; and applying said each data operation to said second partition in accordance with locations specified in said each data operation when partitions between said first data partition and said second data partition are unlocked and while holding said first lock and said second lock.

19. The computer readable medium of claim 18, further comprising executable code for processing said at least two data operations in a multipath environment in which two or more data paths to a data storage device are used simultaneously for two or more data operations.

20. The computer readable medium of claim 18, wherein a lock is associated with a data partition of a data storage device, and said common portion is a portion of a data storage device.

* * * * *